(12) United States Patent
Kollmer

(10) Patent No.: US 11,360,864 B2
(45) Date of Patent: Jun. 14, 2022

(54) VEHICLE SAFETY ELECTRONIC CONTROL SYSTEM

(71) Applicant: VEONEER SWEDEN AB, Värgärda (DE)

(72) Inventor: Norbert Kollmer, Ismaning (DE)

(73) Assignee: VEONEER SWEDEN AB, Vargarda (SE)

( * ) Notice: Subject to any disclaimer, the term of this patent is extended or adjusted under 35 U.S.C. 154(b) by 456 days.

(21) Appl. No.: 15/567,541

(22) PCT Filed: Apr. 15, 2016

(86) PCT No.: PCT/EP2016/058408
§ 371 (c)(1),
(2) Date: Oct. 18, 2017

(87) PCT Pub. No.: WO2016/169856
PCT Pub. Date: Oct. 27, 2016

(65) Prior Publication Data
US 2018/0105183 A1     Apr. 19, 2018

(30) Foreign Application Priority Data

Apr. 20, 2015 (EP) .................................. 15164320

(51) Int. Cl.
G06F 11/16     (2006.01)
G06F 11/07     (2006.01)
G06F 11/30     (2006.01)
(Continued)

(52) U.S. Cl.
CPC ..... *G06F 11/1645* (2013.01); *B60W 50/0205* (2013.01); *G06F 11/0739* (2013.01);
(Continued)

(58) Field of Classification Search
CPC ..... B60W 2050/0006; B60W 50/0205; B60W 2050/021; G06F 11/0757; G06F 11/0739;
(Continued)

(56) References Cited

U.S. PATENT DOCUMENTS 7,290,169 B2 * 10/2007 Safford ............... G06F 11/1641
714/11
7,747,932 B2 6/2010 Racunas et al.
(Continued)

FOREIGN PATENT DOCUMENTS

CN     101213522 A     7/2008
JP     2008-234141 A     10/2008
(Continued)

OTHER PUBLICATIONS

International Search Report and Written Opinion dated Jun. 21, 2016.

*Primary Examiner* — Bryce P Bonzo
*Assistant Examiner* — Michael Xu
(74) *Attorney, Agent, or Firm* — Dickinson Wright PLLC

(57) ABSTRACT

A vehicle safety electronic control system includes a first microcontroller having a lockstep architecture with a lockstep core and a second microcontroller having at least two processing cores. The lockstep core of the first microcontroller is configured to monitor and control outputs of said at least two cores of the second microcontroller.

20 Claims, 4 Drawing Sheets

(51) Int. Cl.
  *B60W 50/02* (2012.01)
  *G07C 5/08* (2006.01)
  *B60W 50/00* (2006.01)

(52) U.S. Cl.
  CPC ...... *G06F 11/0757* (2013.01); *G06F 11/0793* (2013.01); *G06F 11/165* (2013.01); *G06F 11/1633* (2013.01); *G06F 11/30* (2013.01); *G07C 5/0808* (2013.01); *B60W 2050/0006* (2013.01); *B60W 2050/021* (2013.01)

(58) Field of Classification Search
  CPC ............ G06F 11/0793; G06F 11/1633; G06F 11/165; G06F 11/30; B60Y 2306/15; G07C 5/0808
  See application file for complete search history.

(56) References Cited

U.S. PATENT DOCUMENTS

| | | | |
|---|---|---|---|
| 8,718,876 | B2 | 5/2014 | Matsumura et al. |
| 9,183,098 | B2 | 11/2015 | Abdukadir et al. |
| 9,495,239 | B1* | 11/2016 | Ahmad ................. G06F 11/142 |
| 10,417,153 | B2* | 9/2019 | Rota ....................... G06F 15/17 |
| 2004/0003019 | A1 | 1/2004 | Ali-Santosa et al. |
| 2005/0114735 | A1 | 5/2005 | Smith et al. |
| 2007/0022348 | A1 | 1/2007 | Racunas et al. |
| 2009/0217092 | A1 | 8/2009 | Weiberle et al. |
| 2012/0265405 | A1* | 10/2012 | Matsumura ....... B60W 50/0225 701/45 |
| 2013/0113406 | A1 | 5/2013 | Mills et al. |
| 2014/0143595 | A1 | 5/2014 | Abdukadir et al. |
| 2014/0278447 | A1 | 9/2014 | Unoki et al. |
| 2017/0361852 | A1* | 12/2017 | Topp ................... G06F 11/0757 |

FOREIGN PATENT DOCUMENTS

| | | |
|---|---|---|
| JP | 2010-211391 A | 9/2010 |
| JP | 2012-218621 A | 11/2012 |
| JP | 2013-025570 A | 2/2013 |
| JP | 2013-057825 A | 3/2013 |
| JP | 2014-102662 A | 6/2014 |
| JP | 2014-191655 A | 10/2014 |
| JP | 2015-067107 A | 4/2015 |

* cited by examiner

VEHICLE SAFETY ELECTRONIC CONTROL SYSTEM

CROSS-REFERENCE TO RELATED APPLICATIONS

This application is a 35 U.S.C. § 371 national phase application of International Application No.: PCT/EP2016/058408, filed Apr. 15, 2016, which claims the benefit of priority under 35 U.S.C. § 119 to European Patent Application No.: 15164320.2, filed Apr. 20, 2015, the contents of which are incorporated herein by reference in their entirety.

FIELD OF THE INVENTION

The present invention relates to an electronic control system, and more particularly relates to a vehicle safety electronic control system.

BACKGROUND

The complex nature of modern vehicular safety systems places great importance on the performance and reliability of the electronic control systems which are required to provide and manage the safety systems. Such control systems typically include integrated hardware and software in order to host and run so-called Advanced Driver Assistance Systems (ADAS) algorithms.

Such systems are required to satisfy very stringent safety requirements such as the ISO 26262 Functional Safety for Road Vehicles standard which defines a so-called Automotive Safety Integrity Level (ASIL) risk classification scheme. ASIL-D represents the highest integrity requirements under this standard, and is applicable to safety-related processing tasks.

SUMMARY

A requirement of the functional safety standard is that the control system must be capable of identifying safety relevant errors in its arithmetic, logical and memory units, which is only possible for an ASIL-D electronic control unit if a lockstep processor architecture is used. However, lockstep architectures of this type have only a relatively low processing power which is insufficient to handle modern applications like ADAS with a set of suitable sensors such as Radar, Lidar and/or cameras. There is therefore a need for a vehicle safety electronic control system which is capable of providing improved processing power whilst satisfying the required safety integrity requirements.

Current high performance microprocessors are too complex to achieve the required safety integrity requirements via cyclic diagnostic tests for permanent and transient error detection.

According to the present invention, there is provided a vehicle safety electronic control system comprising: a first microcontroller having a lockstep architecture with a lockstep core; and a second microcontroller having at least two processing cores; wherein lockstep core of the first microcontroller is configured to monitor and control outputs of said at least two cores of the second microcontroller.

The first microcontroller may have at least one non-lockstep core.

The lockstep core of the first microcontroller may be configured to receive, from said second microcontroller, data representing the direct outputs of the second microcontroller cores.

The lockstep core of the first microcontroller may be configured to receive, from said second microcontroller, data representing a comparison of the outputs of the second microprocessor cores, and is configured to derive therefrom an operational status of the second microcontroller.

The first microcontroller may be configured to determine from said comparison data whether either of said second microcontroller cores is disturbed or faulty.

The lockstep core of the first microcontroller may be configured to do at least one of the following in response to determining that either of said second microcontroller cores is disturbed or faulty: send an error message to a vehicle safety system; reset the disturbed or faulty core; and enter the disturbed or faulty core into a predefined safe state.

Both of said two cores of the second microcontroller may be operable to execute the same software operation in synchronism to obtain respective results, and each of said two cores is operable to compare its respective result with the result of the other core to thereby derive said comparison data.

Each of said two cores of the second microcontroller may be operable to compare its said result with said result of the other core after each frame during execution of said software.

The cores of the second microcontroller may be operable to execute vehicle safety-related software.

The first and second microcontrollers may be configured to operate synchronously.

The first microcontroller may be configured to monitor the second microcontroller cyclically with a predetermined cycle time.

The cycle time may be shorter than the time required to transition the first or each second microcontroller core to its respective said safe state.

The first microcontroller may be configured to act as a watchdog timer for the second microcontroller.

The lockstep core of said first microcontroller may be operable to execute a software watchdog application.

The software watchdog application may include a heartbeat monitoring unit, a program flow checking unit, and a task state indication unit.

The control system may be provided in the form of an integrated electronic control unit.

The electronic control system of the present invention may be provided as a part of an electronic safety system in a motor vehicle such as, for example, an Advanced Driver Assistance System (ADAS) which may include a blind spot monitoring system; an active cruise control system; a pre-safe braking system; a collision avoidance system; a lane departure prevention system; and/or a rear-collision mitigation system.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION OF THE INVENTION

Figure 1:
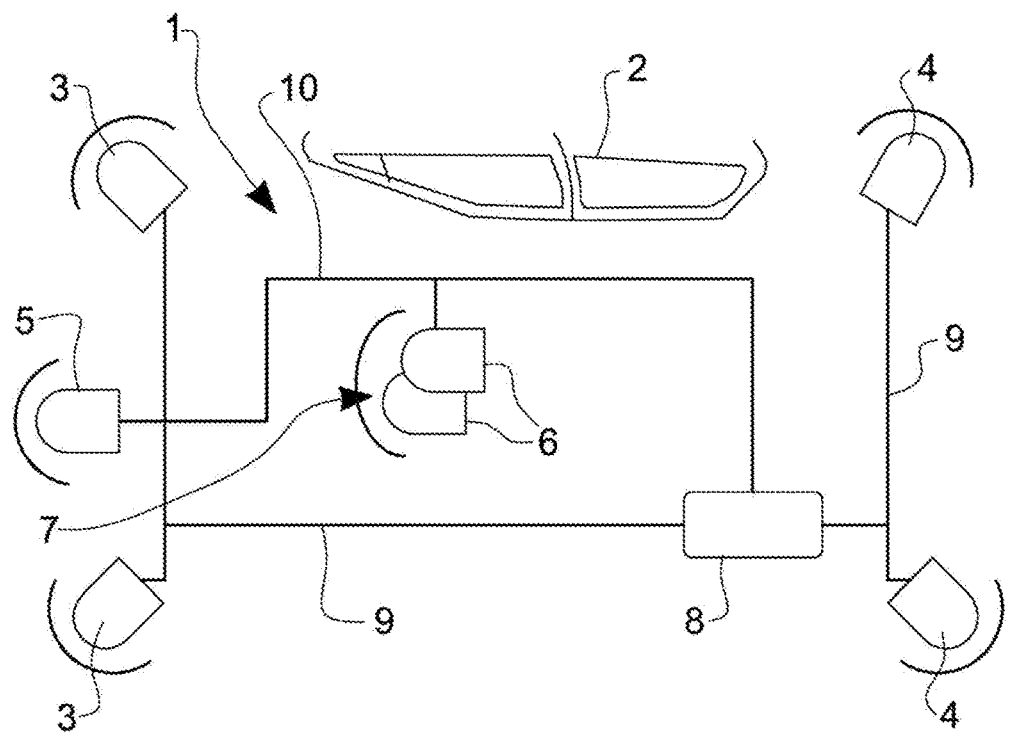
FIG. 1 is a schematic illustration showing an overview of a motor vehicle safety system, which may include an electronic control system in accordance with the present invention.

Turning now to consider FIG. 1 in more detail, there is illustrated a schematic representation of an exemplary electronic safety system 1 installed in a motor vehicle 2 (only one side panel of which is denoted in FIG. 1 to indicate the vehicle's orientation). The safety system 1 comprises a number of different types of sensor mounted at appropriate positions on the motor vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the central control unit 8 via a Controller Area Network ("CAN") bus 9, and the LRR sensor 5 and the sensors of the SVS 7 are connected to the central control unit 8 via a faster FlexRay serial bus 10, also of a type known per se.

Collectively, and under the control of the control unit 8, the various sensors 3-6 can be used to provide a variety of different types of driver assistance systems such as, for example, blind spot monitoring, adaptive cruise control, collision prevention assist, lane departure protection, and rear collision mitigation. Accordingly, the control unit 8 will be configured to run appropriate software algorithms for each such driver system.

Figure 2:
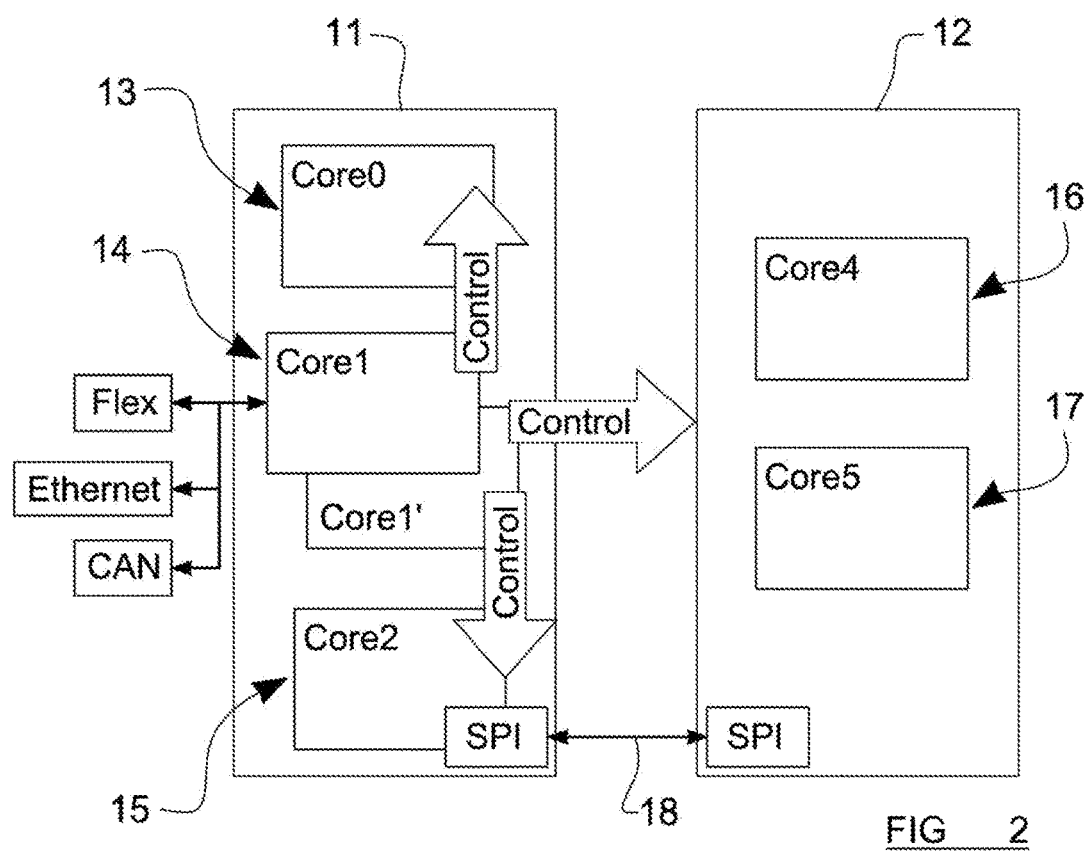
FIG. 2 is a schematic illustration showing an overview the principal hardware elements of an electronic control system in accordance with the present invention.

FIG. 2 illustrates schematically the principal hardware elements of a control system in accordance with the present invention, which it will be appreciated could be provided in the form of the integrated control unit 8 illustrated in FIG. 1. The control system comprises a first (master) microcontroller 11, and a second (slave) microcontroller 12. As will become apparent, the master microcontroller 11 is configured to run safety software to live up to the strictest (ASIL-D) safety integrity requirements of the system, which require the identification of processing errors and thus a lockstep architecture, whilst the slave microcontroller 12 has a higher processing power and no lockstep architecture, and is configured to handle some safety-related processing tasks in order to relieve the master microcontroller 11. Because the master microcontroller 11 is configured to satisfy the strict safety integrity requirements of the system it can be considered to represent a so-called "safety microcontroller". Similarly, because the slave microcontroller 12 is configured to have a higher processing power than the master microcontroller, it can be considered to represent a so-called "performance microcontroller".

In more detail, in the particular embodiment illustrated, the master microcontroller 11 has a lockstep architecture comprising three processing cores 13, 14, 15 which are denoted as "Core 0", "Core 1/1'", and "Core 2" respectively in FIG. 2. As will therefore be appreciated, core 14 (denoted Core 1/1') in FIG. 2) represents the so-called lockstep core (or redundant core) of the master microcontroller 11. The slave microcontroller 12 does not require a lockstep architecture, and in the illustrated embodiment comprises two processing cores 16, 17, which are denoted "Core 4" and "Core 5" respectively in FIG. 2. It is to be noted, however, that in other embodiments it is possible for either the master microcontroller 11, or the slave microcontroller 12, to have more processing cores (not illustrated in FIG. 2).

In currently preferred embodiments it is envisaged that the master microcontroller 11 may be provided in the form of an Aurix TC29x processor which is commercially available from Infineon Technologies AG, whilst the slave microcontroller 12 may be provided in the form of a Fusion28 processor which is commercially available from Texas Instruments Inc. Accordingly, in such an embodiment it is envisaged that each core 13, 14, 15 the master microcontroller will perform at 500 DMIPS, whilst each core 16, 17 of the slave microcontroller 12 will perform at 3000 DMIPS, which it will be noted represents a significantly higher processing power in comparison to the cores of the master microcontroller 11. It is to be appreciated, however, that other types of processor could be used for either or both the master microcontroller and the slave microcontroller.

The two microcontrollers are operatively connected via a synchronous serial communication interface in the form of a Serial Peripheral Interface ("SPI") bus, as denoted schematically at 18 in FIG. 2, and are thus configured to operate synchronously. In preferred embodiments, it is envisaged that the SPI bus 18 will be provided in the form of a quad SPI connection having four channels operable in a simplex mode to establish the required bandwidth between the two microcontrollers.

Accordingly, as denoted schematically in FIG. 2, the master microcontroller's lockstep core 14 is configured to monitor and control both of the processing cores 16, 17 of the slave microcontroller 12 as well as its own other two processing cores 13, 15 of the master microcontroller 11. As also illustrated in FIG. 2, the master microcontroller 11 is configured for direct connection to the vehicle buses, which may include the CAN and FlexRay buses 9, 10, and an Ethernet bus.

Figure 3:
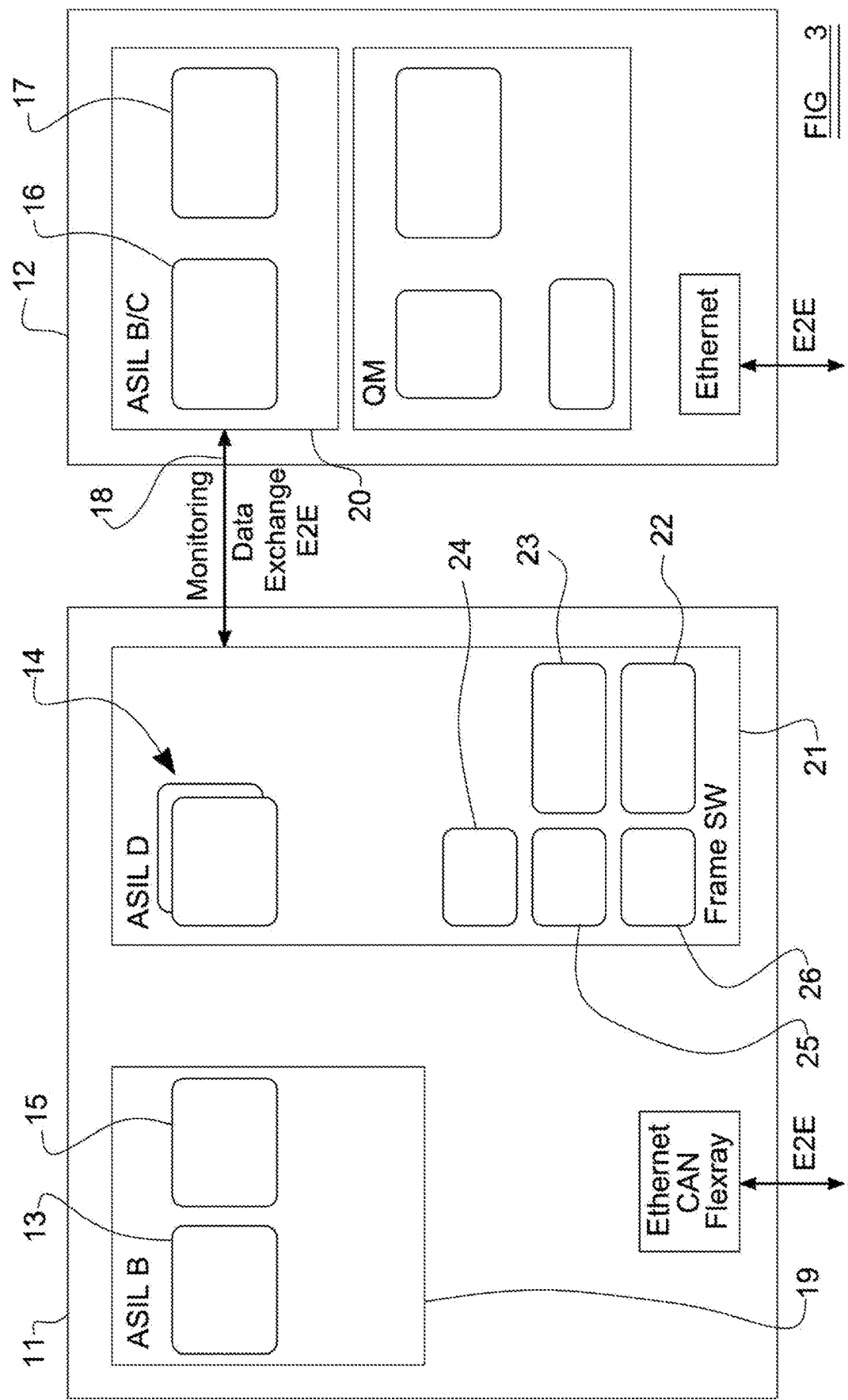
FIG. 3 is a schematic illustrated similar to that of FIG. 2, but which shows a preferred allocation of microprocessor cores to ASIL integrity requirements.

Turning now to consider FIG. 3, it will be noted that the two non-lockstep cores 13, 15 of the master microcontroller 11 are configured to run safety related software, which may be considered to represent so-called "Black Box" software, denoted schematically by block (software) 19 in FIG. 3. Because this software 19 is safety related, it's processing is required to satisfy the AS IL-B safety integrity requirement, and so can be reliably and safely handled by to the two non-lockstep cores 13, 15.

The two processing cores 16, 17 of the high performance slave microcontroller 12 are configured to run safety-related software, which can again be considered to represent so-called "Black Box" software as denoted schematically by block (safety-related software) 20 in FIG. 3. The manner in which the two slave cores 16, 17 operate will be described in more detail herein below, but it is to be noted that the cores 16, 17 only operate in satisfaction of a relatively low (ASIL-B/C) safety integrity requirement, rather than the strictest (ASIL-D) standard. This is permissible in the system of the present invention because, as will also be explained in more detail herein below, the outputs of the two slave cores 16, 17 are monitored and controlled by the lockstep core 14 of the master microcontroller 11, which does operate in satisfaction of the strictest (ASIL-D) standard, via data exchange on the SPI bus 18. Because the slave cores 16, 17 have a significantly higher processing power than the lockstep core 14, the slave microprocessor is able to run the complex safety-related software more quickly and efficiently than the master microcontroller 11 would be able to. However, because the lockstep core 14 is configured to monitor and control the outputs of the two slave cores 16, 17, the highest (ASIL-D) safety integrity requirements are satisfied.

As will be noted, the particular configuration of the slave microprocessor 12 illustrated in FIG. 3 is a quad core arrangement having other processing cores in addition to the two cores 16, 17 described above. This type of arrangement may be used to provide a sufficient number of processing cores to execute all necessary runnable tasks, such that each runnable task is executed on a dedicated slave core.

As well as monitoring and controlling the outputs of the two slave processing cores 16, 17, the lockstep core 14 of the master microcontroller 11 is configured to run frame software, as denoted by block 21 on FIG. 3. The frame software 21 may include various software components, activeness monitoring unit 28a, arrival rate monitoring unit 28b, control flow monitoring unit 29, and a task state indication unit 30; forming together a so-called complex software watchdog 26.

The master microcontroller 11 includes various hardware components to detect and handle failures such as; internal bus error correcting code 22, memory error correcting code 23, a safety management unit 24, and a memory protection unit 25.

The lockstep core 14 of the master microcontroller 11 is configured to monitor the processing cores 16, 17 of the slave microprocessor 12 cyclically, with a preferred cycle time which is shorter than the time required to transition the cores 16, 17 of the slave microcontroller to a respective safe state. Furthermore, it will be appreciated that by virtue of the complex software watchdog 26, the lockstep core 14 acts as a supervisor for the slave microprocessor 12.

In order to monitor the health of the system and to react to hardware and software faults, a software service is provided by the lockstep core 14 to monitor individual application software components in runtime, thereby improving the overall dependability of the system to meet the safety integrity requirements. The functional safety concept is supported by the complex software watchdog 26 which provides heartbeat monitoring and program flow checking. As will be appreciated, the software watchdog 26 is integrated in the software platform provided on the master microprocessor 11.

Figure 4:
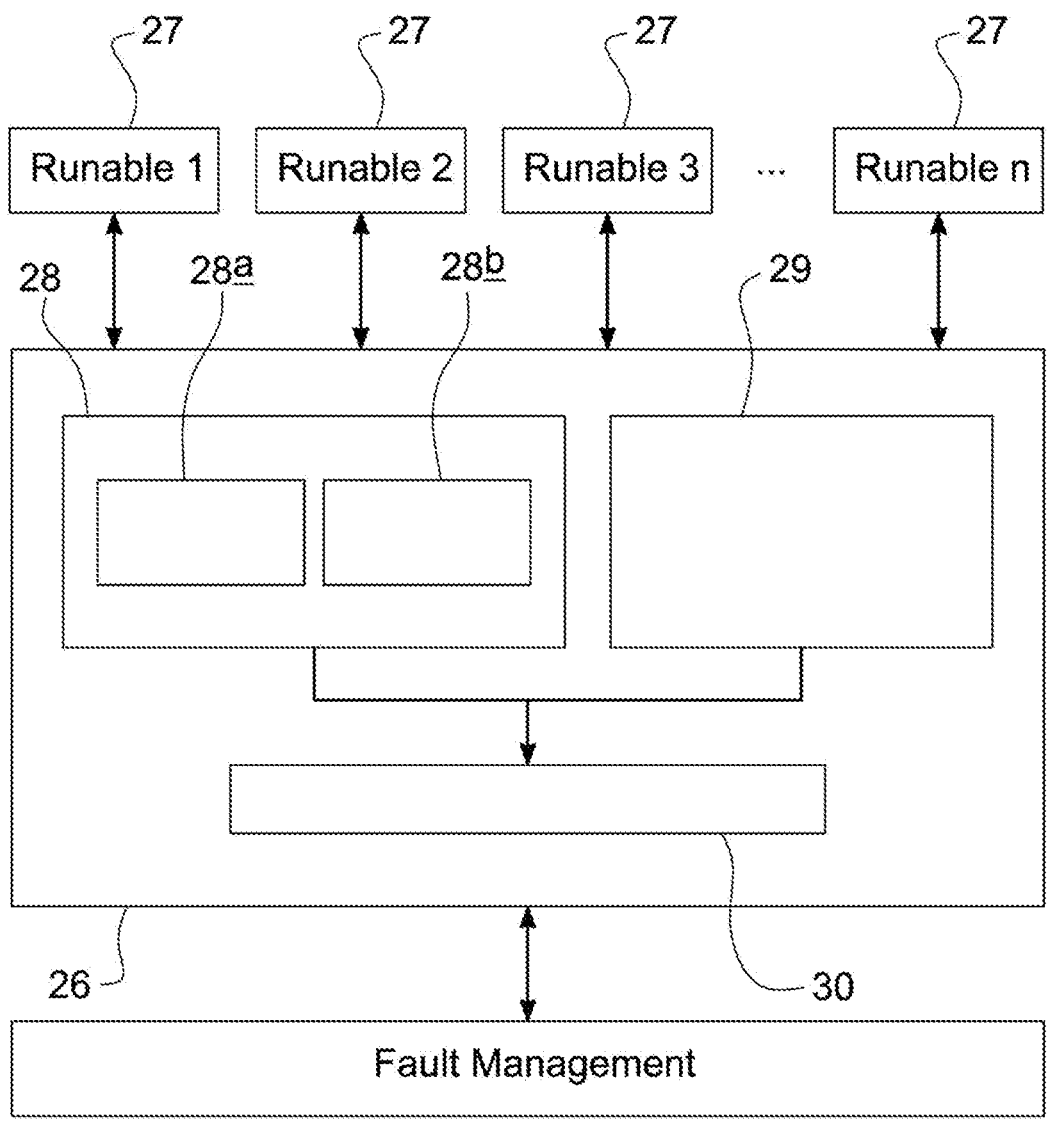
FIG. 4 is a schematic illustration in the form of a flow diagram depicting aspects of a software monitoring aspect of a preferred embodiment of the invention.

The preferred design of the software watchdog 26 follows the concept of heartbeat monitoring of runnable tasks 27 and is illustrated schematically in FIG. 4. The software watchdog 26 includes a heartbeat monitoring unit 28, a control flow monitoring unit 29, and a task state indication ("TSI") unit 30.

With the assistance of a heartbeat indication routine, the various runnable tasks 27 report their heartbeats to the heartbeat monitoring unit 28 of the software watchdog 26. A deadline supervision mechanism of each task may be useful when the task has a relatively low execution priority and is interrupted by one or more tasks of higher priority. Other parameters, such as task response time, can also be used to define the health state of the system.

The control flow monitoring unit 29 monitors the execution sequence of the runnable tasks 27 by comparing real executed successors with a predefined set of possible successors of the predecessors. The operating system executes all runnable tasks in a pre-defined order as defined by a fixed schedule table. The control flow monitoring unit 29 supervises the correct activation of the runnable tasks according to the fixed schedule table. Control flow checking can be achieved at various different levels of granularity.

Errors in any of the runnable tasks 27 which are identified in by the heartbeat monitoring unit 28 and the control flow checking unit 29 are reported to the task state indication unit 30. The task state indication unit 30 then compares the number of detected errors with appropriate predefined threshold values, and generates therefrom individual supervision reports on each runnable task 27. These reports may then be used to derive indication states for the various tasks, which in turn can be used to determine the status of the various software applications.

Turning now to consider the safety-related software 20 which is run by the two processing cores 16, 17 of the slave microcontroller 12, it is to be noted that in preferred embodiments both of the slave cores 16, 17 are configured to execute the same software operations in synchronism to thereby obtain respective results. This is to ensure that appropriate data is generated to pass to the lockstep core 14 of the master microcontroller 11 to satisfy the highest (ASIL-D) safety integrity requirement. Each of the slave cores 16, 17 then operates to compare its respective result with the result of the other core to thereby derive comparison data which comprises two compared results; one provided by each core 16, 17. It is considered particularly advantageous for each of the slave cores 16, 17 to compare its respective result with the corresponding result of the other slave core after each frame during execution of the software, to provide complete comparison data. It is to be noted, however, that whilst currently preferred embodiments are operable to derive comparison data comprising two compared results as explained above, in other embodiments it will be possible to derive only a single compared result, for example when sending the processed data of both slave cores 16, 17 directly to the master microcontroller 11. Also, in some arrangements non-safety related tasks could be processed by the two slave cores 16, 17 in addition to the safety related tasks.

The comparison data obtained in the above-described manner by the slave cores 16, 17 is then sent to the lockstep core 14 of the master microcontroller 12, via the SPI bus 18 together with a processed Cyclic Redundancy Code, message counter and time stamp, for further processing (in accordance with ASIL-D requirements) by its frame software 21. The lockstep core 14 is thus configured to run a diagnostic algorithm on the comparison data to derive an operational status of the slave microcontroller 12, to thereby determine whether or not the slave microcontroller 12 is operating correctly. More particularly, the lockstep core 14 is operable to determine, from said comparison data received from the slave microcontroller 12, whether either of said slave cores 16, 17 is disturbed or faulty. If either slave core 16, 17 is determined to be disturbed or faulty then the lockstep core 14 will send an error message to the relevant receiver to thereby enter it into a safe mode.

As will be appreciated from the foregoing, the control system of the present invention provides significantly improved processing performance for advanced driver assistance systems, whilst ensuring that safety-related software routines are subjected to reliable diagnostic measures in order to satisfy the functional safety integrity requirements. The two processing cores 16, 17 of the slave microprocessor 12 are able to run safety-related software with high processing power, whilst the results and comparison data are reviewed by the lockstep core 14 of the master microcontroller 11 to satisfy safety integrity requirements up to the ASIL-D level. As will also be appreciated, by only sending the calculated results and comparison data from the slave cores 16, 17 to the lockstep core 14 for further processing, rather than the complete data generated, the lockstep core 14 is able to function efficiently with its relatively low (in comparison to the slave cores 16, 17) processing power.

Figure 5:
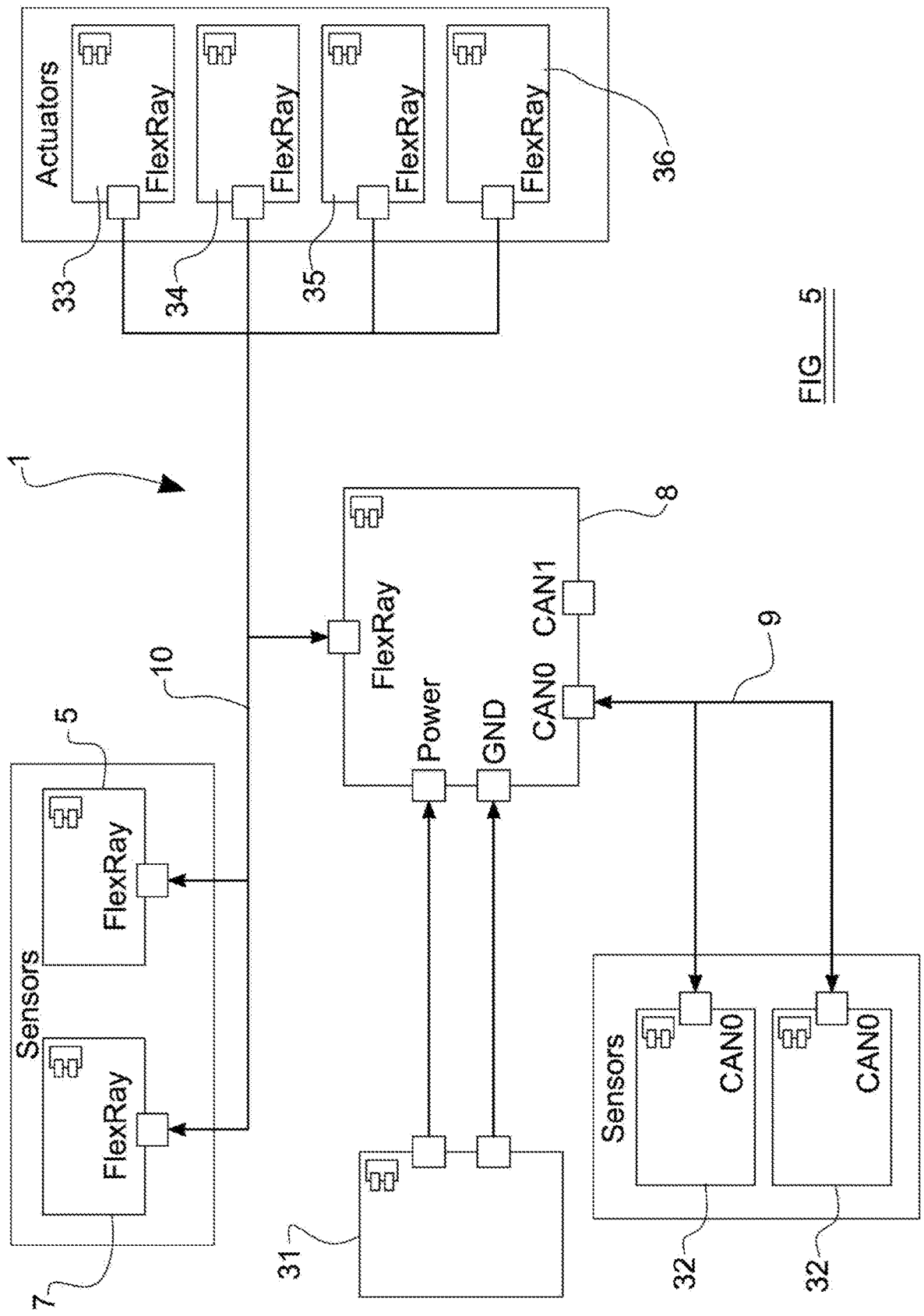
FIG. 5 is a schematic illustration showing an electronic control system in accordance with the present invention installed as part of a motor vehicle safety system.

FIG. 5 is a schematic illustration showing the electronic control system of the present invention embodied in an integrated electronic control unit 8 and forming part of a vehicle safety system 1. The control unit 8 is connected to a suitable power supply 31, and the safety system 1 which it is arranged to control and operate comprises a number of different types of sensors, including: a pair of rear short range radar sensors 32 which are connected to the control unit 8 via a CAN bus 9, an SVS sensor array 7 which is connected to the control unit via a FlexRay bus 10, and a front long range radar sensor 5 which is also connected to the control unit 8 via the FlexRay bus 10. Additionally, the vehicle safety system comprises a number of actuators which are controlled by the control unit 8 to implement corrective actions to maintain the safety of the vehicle in response to signals from the sensors 5, 7, 32, or display or sound alerts to the driver of the vehicle. In the specific system illustrated in FIG. 5, the actuators include are provided as part of: the vehicle's Electronic stability/brake system 33, the vehicle's engine control system 34, the vehicle's steering system 35, and the vehicle's instrument cluster 36. All of the actuators are connected to the control unit 8 via the FlexRay Bus 10.

It has been found that the control system of the present invention, comprising a multi-core master microprocessor 11 with a lockstep architecture and a slave microprocessor 12 having at least two processing cores 16, 17, provides high overall processing power whilst still satisfying the safety integrity requirements up to the ASIL-D level, by using core redundancy in the master microprocessor 11 to achieve the required diagnostic functionality in a very short time period.

In variants of the system of the present invention, it will be possible to provide an additional core in the slave microprocessor 12 to thereby provide a so-called 2oo3 architecture. In this type of arrangement the slave microprocessor 12 would then function as a so-called "fail operational" processor, and a defective slave core could then be identified by comparing the processing results of all three slave cores. This would then permit the software to continue to run even in the event that one of the slave cores is faulty, whilst still satisfying the relevant ASIL safety requirements. If more processing power is required, additional slave processing cores could be provided, or even additional slave microprocessors.

It is to be noted, that whilst the present invention has been described above with reference to a particular embodiment in which data is sent between the master microcontroller 11 and the slave microcontroller 12 via the SPI bus 9, it is also possible to connect the slave microcontroller to a vehicle bus, and to transmit the data over that connection.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A vehicle safety electronic control system comprising:
a first microcontroller having a lockstep architecture with a lockstep core;
a second microcontroller having at least two processing cores; and
wherein the lockstep core of the first microcontroller is configured to monitor and control outputs of the at least two cores of the second microcontroller;
wherein the lockstep core of the first microcontroller is configured to receive, from the second microcontroller, data representing direct outputs of the second microcontroller cores;
wherein the first microcontroller is configured to monitor the second microcontroller cyclically with a predetermined cycle time; and
wherein the cycle time is shorter than the time required to transition the first or each second microcontroller core to its respective safe state.

2. The control system according to claim 1, wherein the lockstep core of the first microcontroller is configured to receive, from the second microcontroller, data representing a comparison of the direct outputs of the cores of the second microprocessor, and is configured to derive therefrom an operational status of the second microcontroller.

3. The control system according to claim 2, wherein the first microcontroller is configured to determine from the comparison data whether either of the second microcontroller cores is disturbed or faulty.

4. The control system according to claim 2, wherein the lockstep core of the first microcontroller is configured to do at least one of the following in response to determining that either of the second microcontroller cores is disturbed or faulty: send an error message to a vehicle safety system; reset the disturbed or faulty core of the second microcontroller; and enter the disturbed or faulty core into a predefined safe state.

5. The control system according to claim 2, wherein both of the two cores of the second microcontroller are operable to execute the same software operation in synchronism to obtain respective results, and each of the two cores is operable to compare a result of one of the cores with the result of the other core to thereby derive the comparison data.

6. The control system according to claim 5, wherein each of the two cores of the second microcontroller is operable to compare the result of one of the cores with the result of the other core after each frame during execution of software.

7. The control system according to claim 1, wherein the cores of the second microcontroller are operable to execute vehicle safety-related software.

8. The control system according to claim 1, wherein the first and second microcontrollers are configured to operate synchronously.

9. A vehicle safety electronic control system comprising:
a first microcontroller having a lockstep architecture with a lockstep core and a first Serial Peripheral Interface transceiver;
a second microcontroller having at least two processing cores and a second Serial Peripheral Interface transceiver in communication with the first Serial Peripheral Interface transceiver by a Serial Peripheral Interface bus; and
wherein the lockstep core of the first microcontroller is configured to monitor and control outputs of the at least two cores of the second microcontroller;
wherein the lockstep core of the first microcontroller is configured to receive, from the second microcontroller, data representing direct outputs of the second microcontroller cores, and wherein the data representing the direct outputs of the second microcontroller cores is transmitted from the second microcontroller to the first microcontroller via the Serial Peripheral Interface bus;
wherein the lockstep core of the first microcontroller is configured to receive, from the second microcontroller, data representing a comparison of the direct outputs of the cores of the second microprocessor, and is configured to derive therefrom an operational status of the second microcontroller;
wherein the lockstep core of the first microcontroller is configured to do at least one of the following in response to determining that either of the second microcontroller cores is disturbed or faulty: send an error message to a vehicle safety system; reset the disturbed or faulty core of the second microcontroller; and enter the disturbed or faulty core into a predefined safe state;
wherein the first microcontroller is configured to monitor the second microcontroller cyclically with a predetermined cycle time; and
wherein the cycle time is shorter than the time required to transition the first or each second microcontroller core to its respective safe state.

10. The control system according to claim 1, wherein the first second microcontroller is configured to act as a watchdog timer for the second microcontroller.

11. The control system according to claim 10, wherein the lockstep core of the first microcontroller is operable to execute a complex software watchdog application.

12. The control system according to claim 11, wherein the software watchdog application includes a heartbeat monitoring unit, a program flow checking unit, and a task state indication unit.

13. The control system of claim 1, wherein the control system is provided as an integrated electronic control unit.

14. The control system of claim 1, wherein the first microcontroller is configured to monitor the second microcontroller cyclically with a predetermined cycle time.

15. The control system according to claim 14, wherein both of the two cores of the second microcontroller are operable to execute the same software operation in synchronism to obtain respective results, and each of the two cores is operable to compare a result of one of the cores with the result of the other core to thereby derive the comparison data.

16. The control system according to claim 15, wherein each of the two cores of the second microcontroller is operable to compare the result of one of the result with the result of the other core after each frame during execution of software.

17. The control system according to claim 2, wherein: the first microcontroller is configured to determine from the comparison data whether either of the second microcontroller cores is disturbed or faulty; wherein the lockstep core of the first microcontroller is configured to do at least one of the following in response to determining that either of the second microcontroller cores is disturbed or faulty: send an error message to a vehicle safety system; reset the disturbed or faulty core of the second microcontroller; and enter the disturbed or faulty core into a predefined safe state; and wherein both of the two cores of the second microcontroller are operable to execute the same software operation in synchronism to obtain respective results, and each of the two cores is operable to compare a result of one of the cores with the result of the other core to thereby derive the comparison data.

18. The control system according to claim 17, wherein each of the two cores of the second microcontroller is operable to compare the result with one of the cores with the result of the other core after each frame during execution of software.

19. The control system of claim 1, wherein the first microcontroller includes a first Serial Peripheral Interface transceiver, and the second microcontroller includes a second Serial Peripheral Interface transceiver in communication with the first Serial Peripheral Interface transceiver by a Serial Peripheral Interface bus, and
wherein the data representing direct outputs of the second microcontroller cores is transmitted to the lockstep core of the first microcontroller via the Serial Peripheral Interface bus.

20. The control system of claim 19, wherein the Serial Peripheral Interface bus includes a quad SPI connection having four channels.

* * * * *